Dec. 6, 1938.  H. J. HUNTER  2,139,585
MANUFACTURE OF CARBON BLACK
Filed April 18, 1935
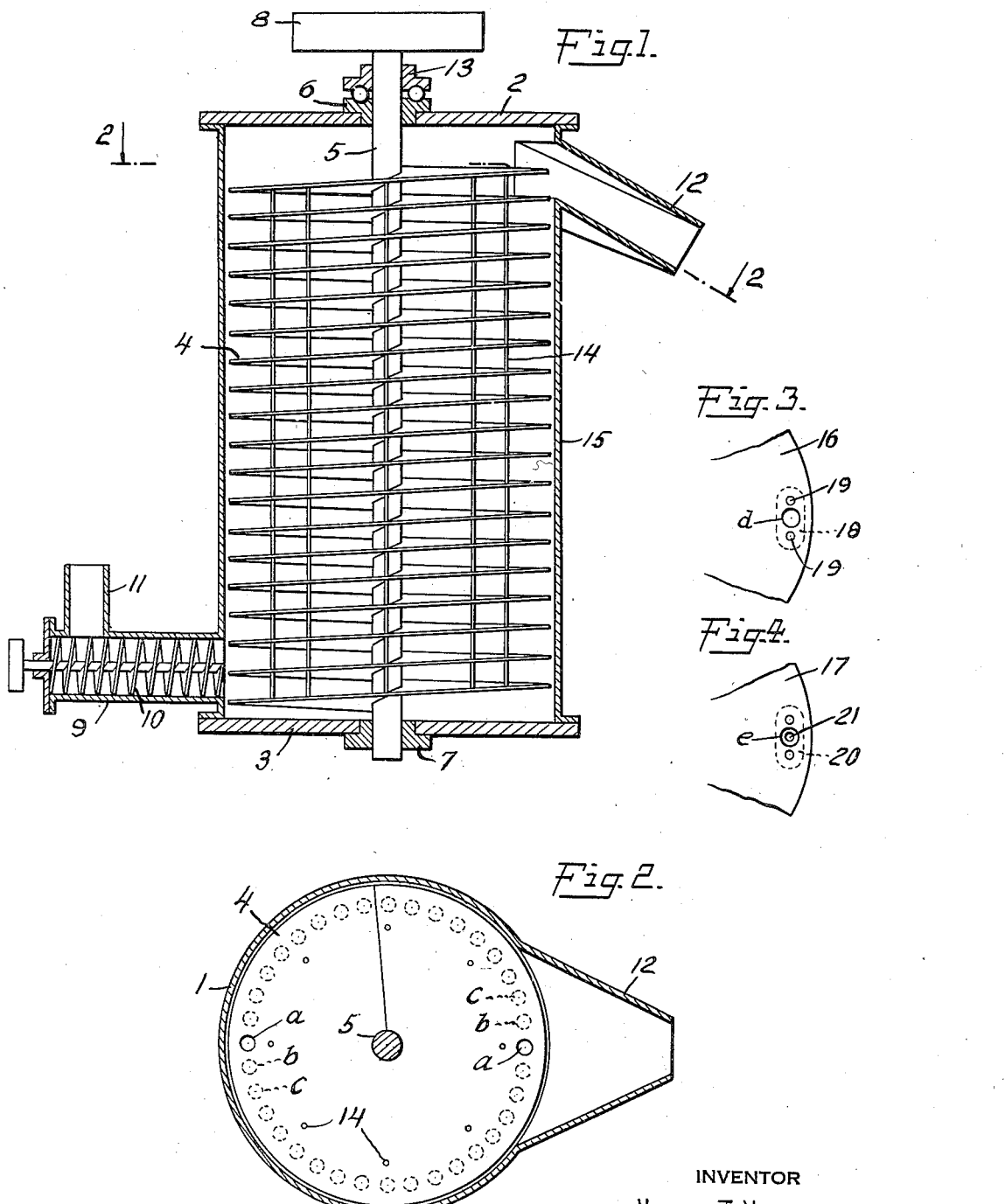
INVENTOR
Howard J. Hunter
BY
Pennie, Davis, Marvin & Edmonds
ATTORNEYS Patented Dec. 6, 1938

2,139,585

UNITED STATES PATENT OFFICE 2,139,585

MANUFACTURE OF CARBON BLACK

Howard J. Hunter, Fairbanks, La., assignor to Columbian Carbon Company, New York, N. Y., a corporation of Delaware Application April 18, 1935, Serial No. 16,970

10 Claims. (Cl. 134—60)

The present invention relates to the treatment of finely subdivided solids or flocculated powders such as carbon black.

In many instances the essential characteristics of such material which render them particularly valuable to the industries are their extremely fine state of subdivision and their susceptibility to ready and uniform dispersion in liquids, plastics and the like.

Carbon black, for instance, is extensively used in the manufacture of rubber compositions, phonograph records, various waxes and resin compositions, paints, varnishes, lacquers, printer's ink and the like in which a high degree of subdivision and ready and uniform dispersion are essential. Its extreme fine state of subdivision, though an essential characteristic, is a distinct handicap in the shipping, storing and the handling of the black incidental to its use. Also, the apparent density of carbon black is so low that frequently less than 10 pounds will occupy a space of one cubic foot. This characteristic greatly increases the cost of packing, shipping and storing. In handling, the light, fluffy powder flies into the air to such an extent that there is a substantial loss of material and an annoyance to workmen in the vicinity as well as the possibility of the contamination of adjacent processes or products.

Numerous attempts have been made to overcome these objectionable properties of carbon black and render it more dense and less dusty. The majority of these attempts have, however, resulted in the destruction or impairment of those physical properties of the black essential to its intended uses. Though these objectionable properties of carbon black have been successfully eliminated in certain instances by treating the black with wetting agents, such treatment entails the extra expense of wetting and again drying the black before shipment.

My invention relates more particularly to an improved process whereby these finely divided solids, such as carbon black, without the addition of wetting agents or binders, are reduced to small compact balls or pellets resembling shot. These pellets have a much greater apparent density than the original fluffy, powdery substance and can be subjected to ordinary handling incidental to shipment and use without the above-mentioned objectionable flying or dusting. By my process, the bulk of carbon black can be so decreased that twenty-five pounds or more will occupy only one cubic foot of space, yet the product under conditions of use is readily disintegrated into the original finely divided powder in which the essential characteristics of the original substance, i. e., ready and uniform dispersion in materials such as rubber compounds and the like, are unimpaired.

In my application for Letters Patent Serial No. 755,553, of which the present application is in part a continuation, I have described a process and apparatus whereby carbon black, or the like, is reduced to pellet form, without the addition of wetting agents or binders, by subjecting the black to a relatively mild agitation of a type designated "rolling impact". The particular apparatus disclosed in this previous application for effecting the rolling impact comprises a low pitched helical screw vertically arranged and revolvably and concentrically mounted within a cylindrical chamber or drum of somewhat larger diameter than that of the screw or rotor.

According to the specific embodiment of the process described in said earlier application the vertical drum is partly filled with the finely divided carbon black or other material to be treated. The screw is then rotated in a direction designed to move the carbon black upwardly. In this upward passage of the carbon black the particles thereof are rolled along the upper surface of the flights in contact with other particles until sufficient centrifugal force is exerted to cause the particles to roll off the outer edge of the flight. The particles of black thus rolled from the flight fall back downwardly through the clearance between the rotor and the inner wall of the drum, to be again picked up by the rotor and carried upwardly. The passage of the carbon black through this cycle of operations is continued until the desired pellets are formed. The pellet product is then removed from the apparatus.

The present invention constitutes an improvement in the process described in the above-referred to application in that it is capable of continuous operation whereby finely divided carbon black or the like is continuously fed to the process and finished pellets are continuously removed therefrom. The invention also contemplates an apparatus for carrying out this continuous process.

This continuous method of operation possesses distinct advantages over batch methods previously employed. For instance, when the optimum operating conditions for any given type of material have been established, those conditions can be maintained without interruption. Also, where the continuous operation is employed, the time and labor otherwise consumed in charging and discharging the apparatus is saved and more economical operation is, accordingly, obtained. Furthermore, where a batch method is employed, a relatively large amount of the finely divided material is charged to the drum and in the early stages of the process the ratio of finely divided material to pellets present in the apparatus is much greater than at a later stage of the operation when the formation of pellets has progressed, or in still later stages of the operation where the charge may be substantially completely reduced to pellet form. Under such circumstances, the nature of the treatment to which the charge is subjected progressively changes and closer watch over the process is necessary to avoid over-treatment of the charge. According to my improved process, the operation continues substantially unattended after optimum operating conditions for a particular material, such as rate of feed and rate of rotation of the screw, have been determined.

My invention will be specifically described with reference to the accompanying drawing, which illustrates one form of apparatus contemplated by my present invention and particularly adapted to the carrying out of the process thereof. It will be understood, however, that my invention is not limited to this specific illustration.

Figure 1 of the drawing shows in a somewhat conventional and diagrammatic manner an elevation partly in section of one form of apparatus adapted to carrying out the process of the invention and Figure 2 is a horizontal cross-sectional view of the apparatus of Figure 1 along the line 2—2. Figures 3 and 4 are fragmentary plan views of flights of the rotor showing modifications of my invention.

The apparatus illustrated in the drawing comprises a vertically disposed cylindrical shell or drum 1 closed at the upper end by plate 2 and at the lower end by plate 3. Centrally located within the drum 1 is a helical screw 4 rigidly fastened to and supported by shaft 5. The shaft 5 is supported by an upper bearing 6 and a lower bearing 7, centrally located in the plates 2 and 3, respectively. The helical screw 4 is designed to be rotated at various speeds within the drum 1 by means of the shaft 5. Force for rotating the shaft 5 is transmitted through any convenient means, such as pulleys 8. Specific means for varying the speed of rotation of the shaft 5 are not shown but any of the well known methods may be employed.

The feed conduit 9, equipped with any suitable conveyor mechanism such as feed screw 10 leads to the lower end of cylinder 1 and by means of conduit 11 connects said drum with the source of supply of raw material, such as a storage bin or a hopper, not shown. The chute 12 leads downwardly from the upper end of the cylinder 1, as shown. The upper bearing 6 is conventionally shown as being of the thrust-bearing type and is a convenient means for supporting the rotor 4 and the charge carried thereby, the collar 13 being rigidly fastened to the shaft 5.

The clearance between the rotor 4 and the inner walls of the drum 1 is advantageously only sufficiently large to permit the free rotation of the rotor. With small apparatus this clearance can be made as small as ⅛", but of necessity is somewhat controlled by mechanical difficulties, such as lack of rigidity of the rotor and the deviation in curvature of the walls of the drum 1, which should be as nearly cylindrical as circumstances permit.

In apparatus of smaller diameter the flights may be made sufficiently rigid without the use of supports other than shaft 5. However, in apparatus of larger diameter, it may be necessary to support the flights by some additional means such as spacing rods 14 shown in the drawing. I prefer to avoid the use of spacing rods where the flights can otherwise be made sufficiently rigid as they tend to obstruct the normal path of the black.

The flights of the rotor may be advantageously perforated so that a portion of the material passing along a particular flight may fall through these perforations onto the flight below. The optimum size and location of these perforations will vary somewhat with the size of the particular apparatus and the nature of the material being treated. For example, in an apparatus having a rotor 23½" in diameter, two 1" holes were punched along the diameter of each flight, one on either side of the shaft, with centers 1½" from the outer edge of the flight. As the flights descended the holes were moved counter-clockwise around the circle about 10 degrees so that each hole trailed the one on the same side of the shaft in the flight above it by about 1½". The purpose of these holes, as stated above, is to allow a portion of the carbon black, or the like, being treated to fall from one flight onto the flight below in order to lengthen its path of travel through the apparatus and thereby prolong the treatment.

Referring to Fig. 2 of the drawing, the holes in the flights are represented by the small circles identified by letters. The holes in the flight approximately within the plane of Fig. 2 are represented by the two full line circles indicated by the letter $a$. The holes in the flight just below are represented by the dotted line circles $b$, the holes in the next lower flight by the dotted line circles $c$, and so on.

In operation, the carbon black or like material to be treated is continuously charged to the apparatus through the conduit 9 by means of the feed screw 10, while the rotor 4 is being operated in the direction tending to carry the charge upwardly. In its upward passage along the flights of the screw, the carbon particles are subjected to a relatively mild form of agitation, consisting of the rolling and tumbling of said particles along the surface of the flights in contact with other particles, which results in the adhering of certain of said particles to other particles to form small balls or pellets of more or less spherical form, as is more fully described in application Serial No. 755,553.

The lifting action of the rotor upon the pellets appears to be greater than upon the finely divided carbon black, so that there is a greater tendency for them to climb the flights to the upper end of the drum, where they pass from the apparatus through the chute 12 while the finely divided black remains behind for further treatment.

The amount of rolling impact required to form the pellets is largely dependent upon the nature of the material being treated. Accordingly, when treating a material which is readily reduced to pellet form, it is not necessary to prolong the treatment to the extent desirable when treating material which is less readily reduced to pellet form. Also, I have found that the characteristics of the pellet product are influenced by varying the extent of the rolling impact treatment after their preliminary formation. For instance, the pellet product is made more dense and firm by increasing the amount of rolling impact to which it is subjected after formation. This additional treatment of the pellets should be of the same mild nature previously described and should be of limited duration as too strenuous or unduly prolonged treatment will break the pellets.

The amount of rolling impact to which the black is subjected, either in pellet form or during the pellet formation stage or both, may be controlled to a considerable extent by varying the amount of carbon black allowed to fall back through the perforations in the flights of the rotor. This control is conveniently effected by varying the number, location or size of these perforations. The optimum conditions for various materials being treated and for the formation of a pellet product having the particular characteristics desired may be obtained in a single apparatus by having the holes in the flights of the rotor of maximum number and size desirable and closing or partially closing such of these holes as appears necessary or desirable under the particular circumstances.

By leaving open the perforations in the upper flights of the apparatus, the path of travel of the pellets after formation is lengthened so that these pellets are subjected to additional rolling impact treatment. By leaving open the perforations in the lower flights of the rotor when a finely divided black, which requires a prolonged stage of rolling impact to form it into pellets, is being treated, this finely divided black may be retained to a greater extent on the lower flights of the apparatus.

As stated above, these conditions may be varied in a given apparatus by varying the number of holes or perforations in the respective flights of the rotor or the size and distribution of those holes. For instance, an existing hole may be completely closed as shown by Fig. 3 of the drawing by bolting or otherwise securing a thin sheet of imperforate metal to the under side of the flight so as to cover the hole. Where it is desired to only partially close the hole, this metal sheet will have in it a hole correspondingly smaller than the original hole in the flight and so positioned as to register therewith as illustrated by Fig. 4 of the drawing.

In Figs. 3 and 4 the fragments of the flights of the rotor are represented at 16 and 17 respectively. The leters $d$ and $e$ indicate the holes or perforations in the respective fragments of the flight. The hole $d$ is shown as being completely closed by the imperforate metal plate 18 removably fastened to the flight below the hole $d$ by means of bolts 19. The hole $e$ is shown in Fig. 4 as being only partially closed by the plate 20, similarly fastened to the flight below the hole $e$ and having in it a hole 21, smaller than the hole in the flight and so positioned as to register therewith.

I have found that still further prolongation of the treatment of the pellets after formation may be obtained by retarding the flow of the pellets from the aparatus so that they accumulate on the upper flights of the rotor. This may be accomplished, for instance, by placing a baffle, not shown in the drawing, across the lower half of entrance to chute 12.

Though I have described my process as being carried out in a single piece of apparatus, such is not essential. The process may be carried out in a plurality of units of apparatus, such as described herein, arranged in series so that the black discharged from the upper end of one unit may be fed into the lower end of a succeeding unit. Such practice is particularly desirable where, from lack of headroom or for some other reason, the apparatus cannot be built of sufficient height to obtain the desired amount of rolling impact in a single unit. Also, where it is desired to subject the pellets to further rolling impact, as discussed above, the pellets produced by one unit of the apparatus may be charged directly to a second unit for this further treatment.

The rotor 4 somewhat resembles an ordinary screw conveyor. However, it differs from the usual design of screw conveyors in that it has an unusually low pitch. The ordinary screw conveyor is designed and operated so that the flights thereof are substantially filled with the material being conveyed. Under such conditions the desired rolling impact is not obtained.

According to the present invention, only a relatively small amount of the material being treated is present on the respective flights at a given time, and under favorable operating conditions, I have observed lifting efficiencies as low as 3% and even lower. Lifting efficiency may be defined as the ratio of the time required for passage of the material through the apparatus to the theoretical time required, based on the absence of slippage. The low lifting efficiency of the apparatus due to slippage, falling back, and the like, of the material results in a greater effective length of travel of the material through the apparatus and prolongs the period of rolling impact.

The pitch of the flights of the rotor 4 is not critical but will vary with the size of the apparatus. Though the desired rolling impact can be imparted to the carbon black by means of helical screws varying in pitch from say 5 to 20° from the horizontal with apparatus of various sizes, for mechanical reasons the pitch should be as low as possible without having the flights so close together that the material being treated becomes packed between them. For example, if a pitch of 5° were used on a helix 6½" in diameter, the flights of said helix would be less than 1" apart, and there would be an apparent tendency for the material to pack between the flights. On the other hand, with a helix of larger diameter a 20° pitch would place the flights so far apart that, in order to have the required number of flights, the height of the apparatus might be prohibitive. By placing the flights as close together as possible the apparatus is made more compact and for a given size apparatus a greater area of moving surface is obtained to impart the desired rolling impact to the carbon black. I have found that with helical screws 8", 12" and 24" in diameter, pitches approximately 12°, 8° and 5°, respectively, are practical from an apparatus viewpoint and, from a process viewpoint, give excellent results.

The optimum speed of rotation of the rotor will vary with the diameter of the rotor and somewhat with the rate and nature of the feed. Within certain limits, peculiar to the particular apparatus used and the material being treated, an increase in speed of rotation, accompanied by an increased rate of feed, results in an increased rate of production, as will be illustrated below.

The maximum speed of rotation is limited by that which would impart to the pellets a centrifugal force sufficiently great to break the pellets by impact with the walls of the drum or which would result in the throwing of the black outside of the zone of the rolling impact action, which will be readily apparent to the operator.

Naturally, the ratio of peripheral speed of the rotor to R. P. M. will be greater with a rotor of larger diameter than with one of smaller diameter. Since the centrifugal force exerted is a function of the size of the apparatus as well as the speed of rotation of the rotor, R. P. M., the optimum speed will largely depend upon the size of the apparatus and is readily determined for a particular apparatus by trial.

For example, in an apparatus having a rotor measuring 23½ inches in diameter, I have found speeds ranging from 68 R. P. M. to 112 R. P. M., corresponding to peripheral speeds approximately 420 to 690 feet per minute, to give satisfactory results. With a rotor of 54" diameter a speed as low as 35 R. P. M., or a peripheral speed of approximately 490 feet per minute, has also been found satisfactory. With a rotor 8" in diameter, speeds of from 140 to 230 R. P. M., or peripheral speeds of from approximately 290 to 480 feet per minute, have been found satisfactory.

The rate of feed to the apparatus is dependent upon the density of the material being treated, the proportion of the material allowed to fall back through the perforations in the flights and also upon the size and speed of the apparatus. Where the carbon black, for instance, has an apparent density of 15 pounds per cubic foot, the pellets are much more readily formed than where a carbon black of an apparent density of 8 pounds per cubic foot is being treated. Accordingly, other conditions being constant, a more dense carbon black may be fed to the apparatus at a higher rate than a less dense black. Too rapid feed causes overloading of the flights. This is apt to result in the pushing of the black upwardly through the drum in the manner of a conventional screw conveyor instead of subjecting it to the rolling impact. Such action is normally indicated by the delivery from the process of finely divided black instead of pellets.

From the above description, the optimum operating conditions under any given set of circumstances may be readily determined by trial.

Where a light fluffy carbon black is being charged to the apparatus for treatment, it is advantageous to mix with the charge a portion of previously formed pellets as a primer. Though I cannot definitely explain the function of these previously formed pellets, they appear to aid the finely divided black in climbing the flights of the rotor whereby they are more effectively subjected to the rolling impact. After the formation of pellets has begun, the introduction of the preformed pellets as a primer may be discontinued. Where the apparatus has not been thoroughly cleaned subsequent to a previous operation so that some pellets formed in the previous operation remain in the apparatus, the introduction of the priming charge is unnecessary.

As a specific illustration of my process, the following examples are given.

The following runs were made on an apparatus substantially as described herein and illustrated in Fig. 1 of the drawing. The drum was 24 inches in diameter. The rotor was 23½ inches in diameter and consisted of 18 flights. The pitch of the rotor was 2¼ inches and the clearance between the rotor and the inner wall of the drum was approximately ¼ inch.

Example I

In this run the rotor was operated at 84 R. P. M. 12 pounds of finely divided carbon black was uniformly fed into the apparatus over a period of seventeen minutes. The discharge of pellets from the upper end of the apparatus began in one minute and fifteen seconds after the feed was started and in twenty-five minutes after the start of the feed 10 pounds of well-formed pellets had been delivered from the apparatus. Analyses of the product showed the following characteristics:

| | |
|---|---|
| Angle of repose_____degrees__ | 25 |
| Density—pounds per cubic foot_____ | 23.6 |
| Percentage remaining on 10 mesh screen____ | .2 |
| Percentage remaining on 30 mesh screen____ | 7.5 |
| Percentage remaining on 40 mesh screen____ | 58.8 |
| Percentage remaining on 80 mesh screen____ | 31.0 |
| Percentage through 100 mesh screen_____ | 2.5 |
| | 100.0 |

Example II

The conditions of this run were the same as those stated under Example I, except that the rate of feed was increased. In the present run 12 pounds of finely divided carbon black was fed to the apparatus over a period of 6½ minutes. Pellets started from the apparatus in 1⅓ minutes after the feed was started and at the end of 11 minutes 11 pounds of pellets had been delivered having the characteristics tabulated below:

| | |
|---|---|
| Angle of repose_____degrees__ | 25 |
| Density—pounds per cubic foot_____ | 24.06 |
| Percentage remaining on 10 mesh screen__ | 0.1 |
| Percentage remaining on 30 mesh screen__ | 9.0 |
| Percentage remaining on 40 mesh screen__ | 59.8 |
| Percentage remaining on 80 mesh screen__ | 29.0 |
| Percentage remaining on 100 mesh screen__ | 0.3 |
| Percentage through 100 mesh screen_____ | 1.8 |
| | 100.0 |

Example III

In this run the apparatus was the same as was employed in the two previous runs. The rotor was operated at a higher speed, namely 112 R. P. M. 12 pounds of finely divided carbon black was uniformly charged to the apparatus over a period of 3½ minutes. The delivery of pellets from the apparatus began in ½ minute after the feed was started. At the end of 5 minutes, 12 pounds of pellets had been delivered from the apparatus, having the characteristics tabulated below:

| | |
|---|---|
| Angle of repose_____degrees__ | 25 |
| Density—pounds per cubic foot_____ | 24.1 |
| Percentage remaining on 10 mesh screen____ | 1.0 |
| Percentage remaining on 30 mesh screen____ | 39.0 |
| Percentage remaining on 40 mesh screen____ | 50.8 |
| Percentage remaining on 80 mesh screen____ | 5.5 |
| Percentage remaining on 100 mesh screen___ | 1.7 |
| Percentage through 100 mesh screen_____ | 2.0 |
| | 100.0 |

No priming charge was used in any of these runs. However, the apparatus was not thoroughly cleaned before starting these runs and undoubtedly a small amount of pellets from the preceding run was present in the apparatus.

The apparatus employed in the runs of Examples I, II and III was successfully operated over a range varying from 68 R. P. M. to 112 R. P. M. with satisfactory results. At the lower speeds the capacity of the apparatus was smaller and also the size of the pellets produced was smaller.

The following example is given as illustrative of the use of several similar apparatus in series where the product from the first apparatus is subjected to additional rolling impact treatment by passage through subsequent apparatus of the series as previously described. Because of lack of sufficient duplicate equipment, the material in the present instance was repeatedly passed through the same piece of apparatus.

*Example IV*

The apparatus employed was substantially as previously described herein and as shown in Fig. 1 of the drawing. The drum was approximately 8" in diameter and 10' in length. The rotor was 7¾" in diameter with a clearance between the rotor and the inner wall of the drum from 1/16 to 1/8 inches. The pitch of the rotor was 2½ inches. The rotor was operated at a peripheral speed of 480 feet per minute. The material treated was carbon black with an apparent density of 9 pounds per cubic foot. This carbon black was charged into the apparatus at the rate of 5 pounds per minute together with previously formed pellets charged at the rate of 3 pounds per minute. The carbon black pellets were delivered from the apparatus at the rate of eight pounds per minute.

After a considerable quantity of pellets had been produced as above described, the charge of finely divided black and priming pellets was discontinued and the product from the first operation was again charged through this apparatus. This procedure was repeated until the material had passed six times through the apparatus, samples being taken after each passage. The characteristics of these samples are tabulated below and illustrate the effect of additional treatment on the pellet product.

| End of— | Density | Angle of repose | Percent remaining on— | | Percent through 100 mesh screen |
| --- | --- | --- | --- | --- | --- |
| | | | 50 mesh screen | 100 mesh screen | |
| | Lbs. per cu. ft. | | | | |
| 1st pass | 16 | 40 | 61 | 24 | 15 |
| 2nd pass | 20 | 32 | 65 | 22 | 13 |
| 3rd pass | 23 | 30 | 68 | 20 | 12 |
| 4th pass | 27 | 30 | 72 | 18 | 10 |
| 5th pass | 28 | 28 | 76 | 16 | 8 |
| 6th pass | 28 | 28 | 78 | 18 | 4 |

It was observed that the pellet product was made considerably harder by this additional rolling impact treatment, the apparent density increasing accordingly.

The pellets produced by these runs were of good quality, being sufficiently firm to withstand handling incidental to shipment and use without crushing and were substantially free from the objectionable dusting.

It will be understood that reference herein to the density of carbon black is not intended to mean the absolute density of the material but rather its apparent density.

I claim:

1. An apparatus for treating finely divided carbon black to form said finely divided powder into pellets, comprising a vertically arranged screw having a central shaft and helical flights extending outwardly therefrom revolvably mounted within a cylindrical chamber closed at its top and bottom, the flights of said screw being inclined not more than 12 degrees from the horizontal, the inside diameter of said chamber being only sufficiently great to permit free rotation of said screw, means for rotating said screw at a speed which will impart rolling impact to the carbon black and in the direction tending to cause the carbon black to roll upwardly along the flights of said screw, whereby the particles of carbon black on said flights are compacted by said rolling movement, means for continuously feeding carbon black to be treated into the lower end of the chamber, and means for removing the pellets from the upper end thereof after the treatment of the carbon black on the flights of the screw has continued for a length of time sufficient to form it into pellets having an apparent density substantially greater than the apparent density of the original carbon black and strong enough to maintain their pellet form during normal transportation.

2. An apparatus for treating finely divided carbon black to form said finely divided powder into pellets, comprising a vertically arranged screw having a central shaft and helical flights extending outwardly therefrom revolvably mounted within a cylindrical chamber, the inside diameter of said chamber being ony sufficiently great to permit free rotation of said screw, the flights of said screw being inclined between about 5° to 20° from the horizontal, means for rotating said screw in the direction tending to cause the carbon black to roll upwardly along the flights of said screw, whereby the particles of carbon black on said flights are compacted by said rolling movement, means for continuously feeding carbon black to be treated into the lower end of said chamber, means for removing the pellets from the upper end thereof after the treatment of the carbon black on the flights of the screw has continued for a length of time sufficient to form it into pellets having an apparent density substantially greater than the apparent density of the original carbon black and strong enough to maintain their pellet form during normal transportation, and means for returning to a lower flight of the screw a portion of the carbon black passing upwardly along a higher flight thereof, before it reaches the upper end of said screw, whereby the path of travel for the carbon black through said apparatus is lengthened.

3. An apparatus for treating finely divided carbon black to form said finely divided powder into pellets, comprising a vertically arranged screw having a central shaft and helical flights extending outwardly therefrom revolvably mounted within a cylindrical chamber, the inside diameter of said chamber being only sufficiently great to permit free rotation of said screw, the flights of said screw being inclined between about 5° to 20° from the horizontal, means for rotating said screw in the direction tending to cause the carbon black to roll upwardly along the flights of said screw, whereby the particles of carbon black on said flights are compacted by said rolling movement, means for continuously feeding carbon black to be treated into the lower end of the chamber, and means for removing the pellets from the upper end thereof after the treatment of the carbon black on the flights of the screw has continued for a length of time sufficient to form it into pellets having an apparent density substantially greater than the apparent density of the original carbon black and strong enough to maintain their pellet form during normal transportation, the flights of said screw having perforations therein to permit a portion of the carbon black passing upwardly along a given flight, except the bottom flight, to fall downwardly onto the next lower flight.

4. An apparatus for treating finely divided carbon black to form said finely divided powder into pellets, comprising a vertically arranged screw having a central shaft and helical flights extending outwardly therefrom revolvably mounted within a cylindrical chamber, the inside diameter of said chamber being only sufficiently great to permit free rotation of said screw, the flights of said screw being inclined between about 5° to 20° from the horizontal, means for rotating said screw in the direction tending to cause the carbon black to roll upwardly along the flights of said screw, whereby the particles of carbon black on said flights are compacted by said rolling movement, means for continuousy feeding carbon black to be treated into the lower end of the chamber, means for removing the pellets from the upper end thereof after the treatment of the carbon black on the flights of the screw has continued for a length of time sufficient to form it into pellets having an apparent density substantially greater than the apparent density of the original carbon black and strong enough to maintain their pellet form during normal transportation, the respective flights of said screw having openings therein to permit a portion of the carbon black passing upwardly along a given flight, except the bottom flight, to fall downwardly onto the next lower flight, and means for closing and for adjusting the size of said openings.

5. An apparatus for treating finely divided carbon black to form said finely divided powder into pellets, comprising a vertically arranged screw having a central shaft and helical flights extending outwardly therefrom revolvably mounted to rotate freely within a cylindrical chamber closed at its top and bottom, the flights of said screw being inclined between about 5° and 12° from the horizontal, means for rotating said screw at a speed which will impart rolling impact to the carbon black and in the direction tending to cause the carbon black to roll upwardly along the flights of said screw, whereby the particles of carbon black on said flights are compacted by said rolling movement, means for continuously feeding carbon black to be treated into the lower end of said chamber, and means for removing the pellets from the upper end thereof after the treatment of the carbon black on the flights of the screw has continued for a length of time sufficient to form it into pellets having an apparent density substantially greater than the apparent density of the original carbon black and strong enough to maintain their pellet form during normal transportation, and means for returning to a lower flight of the screw a portion of the carbon black passing upwardly along a higher flight thereof, before it reaches the upper end of said screw, whereby the path of travel for the carbon black through said apparatus is lengthened.

6. A continuous process for reducing finely divided carbon black to pellet form comprising subjecting said finely divided carbon black to the action of a vertically arranged helical screw enclosed in a chamber and rotating at a peripheral speed in excess of about 290 feet per minute in a direction to lift the carbon back, and the flights of which have a pitch such that during rotation particles of carbon black move upwardly along said flights with a rolling movement such as to effect a compacting of the particles of carbon black by said rolling movement on the flights into substantially dustless, free-flowing pellets without substantially subjecting the carbon black to mechanical pressure, continuously feeding the finely divided carbon black to the lower portion of said chamber into contact with said screw and removing carbon black pellets from the upper portion thereof, such treatment of the carbon black on the flights of the screw continuing for a length of time sufficient to form it into pellets having an apparent density substantially greater than the apparent density of the original carbon black and strong enough to maintain their pellet form during transportation.

7. A continuous process for reducing finely divided carbon black to pellet form comprising subjecting said finely divided carbon black in the presence of previously formed pellets to the action of a vertically arranged helical screw enclosed in a chamber and rotating at a peripheral speed in excess of about 290 feet per minute in a direction to lift the carbon black, and the flights of which have a pitch such that during rotation particles of the carbon black and said previously formed pellets move upwardly along said flights with a rolling movement such as to effect a compacting of the particles of carbon black by said rolling movement on the flights into substantially dustless, free-flowing pellets without substantially sujecting the carbon black to mechanical pressure, continuously feeding the finely divided carbon black to the lower portion of said chamber into contact with said screw and removing carbon black pellets from the upper portion thereof, such treatment of the carbon black on the flights of the screw continuing for a length of time sufficient to form it into pellets having an apparent density substantially greater than the apparent density of the original carbon black and strong enough to maintain their pellet form during transportation.

8. A continuous process for reducing finely divided carbon black to pellet form, comprising subjecting said carbon black to the action of a vertically arranged helical screw enclosed in a chamber, the flights of said screw being inclined not more than 20° from the horizontal, and rotating at a peripheral speed in excess of about 290 feet per minute in a direction to lift the carbon black, whereby particles of carbon black are caused to move upwardly along the flights of said screw with a rolling movement such as to effect a compacting of the particles of carbon back by said rolling movement on the flights into substantially dustless, free-flowing pellets without substantially subjecting the carbon black to mechanical pressure, continuously feeding the carbon black to be treated to the lower portion of said chamber into contact with said screw, preventing more than a negligible quantity of the carbon black from falling from the outer periphery of the screw, returning to a lower flight of the screw a portion of the carbon black passing upwardly along a given flight to prolong the path of travel of the carbon black and removing carbon black pellets from the upper portion of said chamber, such treatment of the carbon black on the flights of the screw continuing for a length of time sufficient to form it into pellets having an apparent density substantially greater than the apparent density of the original carbon black and strong enough to maintain their pellet form during transportation.

9. A continuous process for reducing finely divided carbon black to pellet form comprising subjecting said carbon black to the action of a vertically arranged helical screw enclosed in a chamber and rotating at a peripheral speed in excess of about 290 feet per minute in a direction to lift the carbon black, the flights of which have a pitch such that during rotation particles of carbon black move upwardly along said flights with a rolling movement such as to effect a compacting of the particles of carbon black by said rolling movement on the flights into substantially dustless, free-flowing pellets without substantially subjecting the carbon black to mechanical pressure, continuously feeding the carbon black to be treated to the lower portion of said chamber into contact with said screw, preventing more than a negligible quantity of the carbon black from falling from the outer periphery of the screw, returning to a lower flight of the screw a portion of the carbon black passing upwardly along a given flight to prolong the path of travel of the carbon back, and removing carbon black pellets from the upper portion of said chamber, such treatment of the carbon black on the flights of the screw continuing for a length of time sufficient to form it into pellets having an apparent density substantially greater than the apparent density of the original carbon black and strong enough to maintain their pellet form during transportation.

10. A continuous process for reducing finely divided carbon black to pellet form comprising subjecting said carbon black to the action of a vertically arranged helical screw enclosed in a chamber and rotating at a peripheral speed in excess of about 290 feet per minute in a direction to lift the carbon black, the flights of which have a pitch such that during rotation particles of carbon black move upwardly along said flights with a rolling movement such as to effect a compacting of the particles of carbon black by said rolling movement on the flights into substantially dustless, free-flowing pellets without substantially subjecting the carbon black to mechanical pressure, continuously feeding the carbon black to be treated to the lower portion of said chamber into contact with said screw, preventing more than a negligible quantity of the carbon black from falling from the outer periphery of the screw, returning to a lower flight of the screw a portion of the carbon black passing upwardly along a given flight to prolong the path of travel of the carbon black, causing the pellets to accumulate on the uppermost flights of the screw and removing pellets from the upper portion of said chamber, such treatment of the carbon black on the flights of the screw continuing for a length of time sufficient to form it into pellets having an apparent density substantially greater than the apparent density of the original carbon black and strong enough to maintain their pellet form during transportation.

HOWARD J. HUNTER.